US011386416B1

(12) United States Patent
Wolverton et al.

(10) Patent No.: US 11,386,416 B1
(45) Date of Patent: Jul. 12, 2022

(54) CONTACTLESS ENTERTAINER TIPPING AND SERVICE ORDERING SYSTEM

(71) Applicants: Ronald Wayne Wolverton, Mary Esther, FL (US); Christopher Bradly Posadas, Mary Esther, FL (US)

(72) Inventors: Ronald Wayne Wolverton, Mary Esther, FL (US); Christopher Bradly Posadas, Mary Esther, FL (US)

( * ) Notice: Subject to any disclaimer, the term of this patent is extended or adjusted under 35 U.S.C. 154(b) by 0 days.

(21) Appl. No.: 17/116,506

(22) Filed: Dec. 9, 2020

(51) Int. Cl.
*G06Q 20/32* (2012.01)
*G05B 15/02* (2006.01)
*G06Q 20/20* (2012.01)

(52) U.S. Cl.
CPC ......... *G06Q 20/3267* (2020.05); *G05B 15/02* (2013.01); *G06Q 20/202* (2013.01)

(58) Field of Classification Search
None
See application file for complete search history.

(56) References Cited

U.S. PATENT DOCUMENTS 7,716,081 B1* 5/2010 Olbrich ................ G07F 19/203
705/16

2007/0255653 A1* 11/2007 Tumminaro ......... G06Q 20/327
705/39
2021/0150492 A1* 5/2021 Grossi-Marshall .... G06Q 20/10

OTHER PUBLICATIONS

Ruberstein, Peter "The rise of Twitch-preneurs and the Evolution of tipping" Sep. 24, 2018, https://web.archive.org/web/20191226085429/ https://www.bbc.com/worklife/article/20180924-the-rise-of-the-twitchpreneurs-and-the-evolution-of-tipping (Year: 2018).*
Weir, Melanie "How to update your Venmo profile information on desktop or mobile" Business Insider, Nov. 19, 2019; https://www.businessinsider.com/how-to-update-venmo (Year: 2019).*
Ruberstein, Peter "The rise of Twitch-preneurs and the Evolution of tipping" Sep. 24, 2018, httos://Aweb.archive.org/web/20191226085429/ https :/Avww.bbc.com/worklife/article/20 180924-the-rise-of-the-twitchpreneurs-and-the-evolution-of-tipping (Year: 2018).*

* cited by examiner

*Primary Examiner* — David P Sharvin
(74) *Attorney, Agent, or Firm* — Peter Loffler

(57) ABSTRACT

A contactless tipping system for dancers at an adult entertainment establishment allows proper social distancing between patrons and entertainers. A patron opens an app and enters a tip amount into the app and sends this information to the establishment's computer which identifies the sender, the recipient, and the amount of the tip, either audibly or visually or both and causes a currency cannon to shoot currency, real or imitation, onto the stage. The system allows the patron to select additional services, such as VIP room time, with a selected dancer or to order refreshments.

9 Claims, 4 Drawing Sheets

CONTACTLESS ENTERTAINER TIPPING AND SERVICE ORDERING SYSTEM

BACKGROUND OF THE INVENTION

1. Field of the Invention

The present invention relates to a system whereby a customer can tip a stage entertainer while maintaining social distancing and also to order additional personalized services from the entertainer as well as general services such as food or drink from the establishment whereat the entertainment is occurring.

2. Background of the Prior Art

As the world deals with the SAR-CoV-2 virus, many things are changing, some for the time being, some permanent. One of the norms of limiting the progression of the virus is the concept of social distancing, which means staying several feet apart from other people that do not reside in the same household. This means people need to separate themselves from one another at the grocery store including the parking lot, at the park, at sports venues where many seats remain unoccupied to achieve social distancing, and a myriad of other places where strangers meet.

One area where achieving proper social distancing is difficult is in the adult dancing entertainment business. While maintaining proper spacing between patrons is easy enough, maintaining distance between the dancers of the business and the entertainers is not easy to accomplish. While the dancers are on stage and the patron tables can be sufficiently spaced therefrom, as well as from each other, it is common practice for a patron to approach the stage in order to offer a dancer a cash tip. Typically, the patron takes out paper currency and gives it to the dancer by either tucking the currency into the side of the dancer's G-string bottom or into a garter worn about the dancer's leg. Not only does this tipping procedure violate the separation requirement of social distancing, it often results in a light touch between patron and dancer. As health authorities' frown on such practices and many governments outright ban such practices, another solution must be found.

Instead of placing the currency about the dancer's clothing item, the patron can simply leave a tip on the table, either in cash or on the credit card when the patron cashes out at the end of the evening. While eliminating the need for close interaction between the dancer and the patron, this form of tipping is problematic on many fronts. Many patrons of adult entrainment businesses prefer to use cash only for all transactions as they do not want a paper trail of their visit to a nudie bar on their credit card statement. Many patrons also don't trust the proprietors with having the patron's credit card information. Leaving cash on a table may result in substantial evaporation between the amount of tip money left for a dancer and the amount the dancer actually receives. Additionally, many patrons only want to tip a certain dancer or dancers, not necessarily all of them and may want to tip different amounts to different dancers. While the patron may leave a note with the tip, dictating how the tip is to be distributed, compliance with such instructions may be limited at best. Additionally, many patrons will not remember the names of the dancers that the patron wants to extent a gratitude at tip time. Finally, tipping is generally considered a dynamic event as the patron wants to extend immediate gratitude to a particular dancer at the time of the dance. Correspondingly, the dancer may wish to give the patron a special personalized dance, especially for a particularly generous tip. As such, it is imperative that a patron be able to tip a dancer at the time of the dance and that the dancer know and appreciate who gave the dancer a particular tip.

A system is needed that can achieve the above stated requirements by allowing a patron at an adult dancing entertainment establishment to be able to tip a particular dancer in real time and also allow the dancer to be aware of which patron extended what tip. Such a system must allow for social distancing between the patron and the dancer.

SUMMARY OF THE INVENTION

The contactless entertainer tipping and service ordering system of the present invention addresses the aforementioned needs in the art by providing a system that allows a patron to tip a particular dancer that is on stage and also allows the dancer to know who gave the dancer a particular tip. The contactless entertainer tipping and service ordering system is performed via wireless electronic devices so there is no need for the patron and the dancer to come into close proximity with one another. The contactless entertainer tipping and service ordering system assures that whatever tips are designated for a particular dancer are actually delivered to that dancer and not diffused by others at the establishment. The contactless entertainer tipping and service ordering system can be utilized by a patron who arrives at the establishment bearing only cash. The contactless entertainer tipping and service ordering system is relatively simple and straightforward to implement as well as to use by all concerned parties.

The contactless entertainer tipping and service ordering system is comprised of an establishment computer that has a visual display—this computer may, but need not necessarily be a tablet or similar computer. A patron's handheld electronic device, such as a cellphone, is in communication with the establishment computer. The patron's handheld electronic device has a profile associated with it. An entertainer's computer, which may also be a cellphone or other handheld electronic device, is in communication with the establishment computer. A currency cannon that has a store of currency therein (real or imitation) is in communication with the establishment computer. The patron's handheld electronic device creates either a first transaction (tip or similar) or a second transaction (specific request of an entertainer such as a request for VIP room or similar) and transmits either the first transaction or the second transaction to the establishment computer such that if the patron's handheld electronic device created and transmitted a first transaction, the establishment computer sends a first signal to the currency cannon to dispense an amount of the currency and the establishment computer displays the transaction on the visual display. If the patron's handheld electronic device created and transmitted a second transaction, the establishment relays the second transaction to the entertainer's computer. When the establishment computer sends the first signal to the currency cannon, the establishment computer also sends a second signal, which is a voice message, to a speaker so that the second signal (audio message) is broadcast over the speaker. When the establishment computer relays the second transaction to the entertainer's computer, the establishment computer also transmits the profile to the entertainer's computer. The establishment computer relays the second transaction to the entertainer's computer, the establishment computer also displays the second transaction on the visual display—this being necessary if the entertainer is on stage and does not have her or his computer handy. In this way, the entertainer know that they have been summoned for additional services for a particular patron. A point-of-sale computer is in communication with the establishment computer so that the patron's handheld electronic device creates a third transaction and transmits the third transaction to the establishment computer which relays the third transaction to the point-of-sale computer. The establishment computer has an onboard storage device that has a database wherein each first transaction and each second transaction received by the establishment computer from the patron's handheld electronic device are each stored in the database.

BRIEF DESCRIPTION OF THE DRAWINGS

Similar reference numerals refer to similar parts throughout the several views of the drawings.

DESCRIPTION OF THE PREFERRED EMBODIMENT

Figure 1:
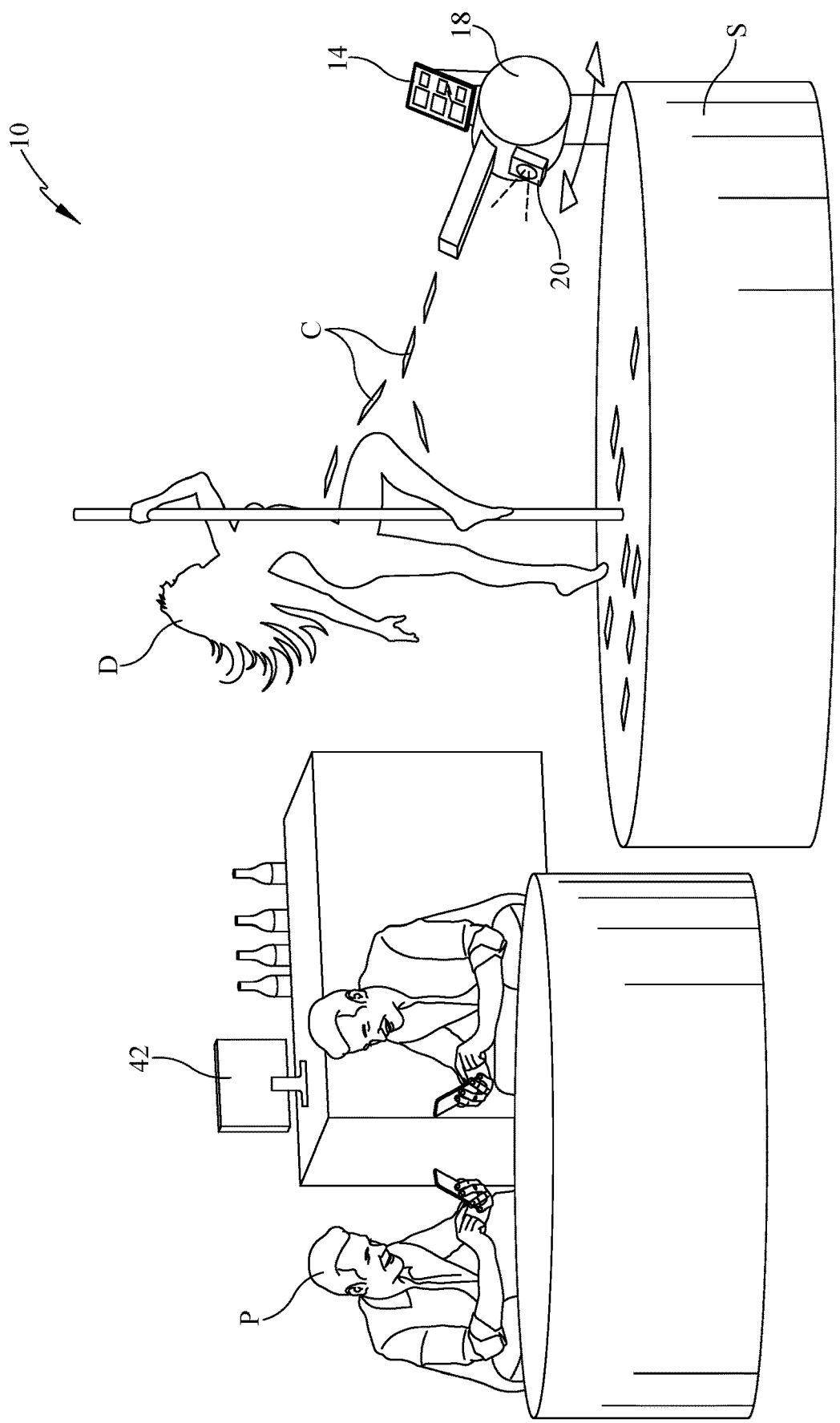
FIG. 1 is an environmental view of the contactless entertainer tipping and service ordering system of the present invention being used at an adult dancing entertainment establishment.
Figure 2:
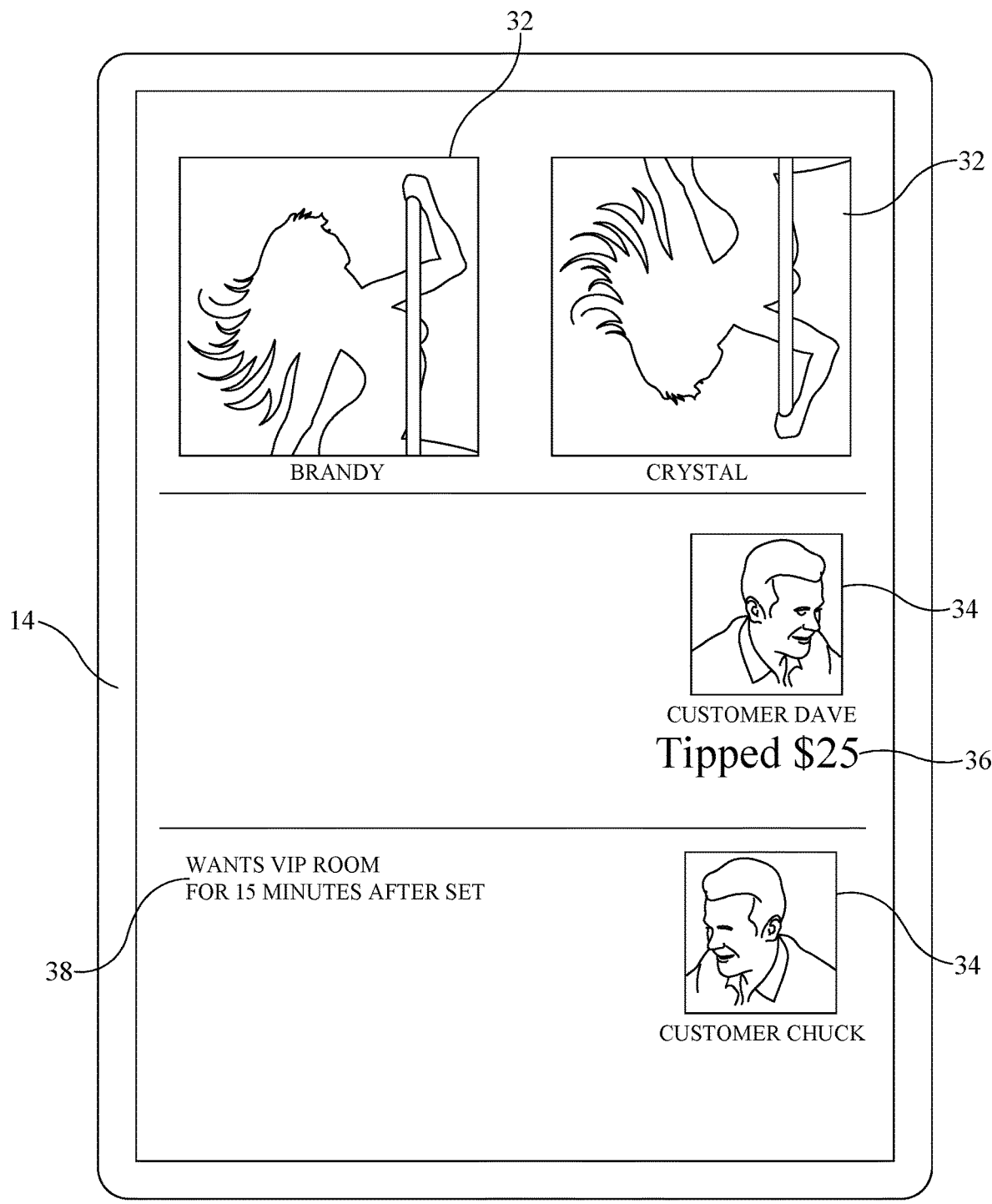
FIG. 2 is a screen shot of the establishment's computer screen used within the contactless entertainer tipping and service ordering system.

Referring now to the drawings, it is seen that the of the present invention, generally denoted by reference numeral 10, is comprised of four major components, namely the patron's handheld electronic device 12, such as the illustrated cellphone, the establishment's computer system 14, which may also be a handheld electronic device such as the illustrated tablet, the entertainer's computer 16, which may be a handheld electronic device such as the illustrated cellphone, and the currency cannon 18.

A patron P establishes an account with the contactless entertainer tipping and service ordering system 10 in typical fashion such as entering a user name and password. The patron P also enters at least some basic information such as first name and optionally a photograph for use by the dancer D as more fully explained below. If desired, the patron P can also establish a payment method such as linking their account with a credit or debit card or the patron P can be an all cash customer.

Each dancer D establishes an account with the contactless entertainer tipping and service ordering system, via her or his electronic device 16 (or possibly another computer) also by entering a user name and password or similar account set up. Each dancer D enters a photo and stage name to be used while dancing. If needed, each dancer D also enters tax information such as W-2 information or the contactless entertainer tipping and service ordering system can be linked to the payroll system of the establishment in appropriate fashion. The establishment's computer 14 is located at an appropriate location proximate the stage S, such as on top of the cannon 18 or similar location, so that each dancer D can readily see the screen.

The cannon 18 is a typical currency cannon with a relatively high capacity for currency C (which of course need not be real) so that frequent refills of the cannon 18 are not needed. As seen, the cannon 18 can rotate back and forth and/or up and down via an appropriate servo motor(s) (not illustrated). An optional speaker 20 may be attached to the cannon 18 at an appropriate location, either attached directly thereon or via an appropriate cable (not illustrated) wireless communication, etc. The cannon 18 can be powered by a battery or by being plugged into a socket in the usual way (neither source of electrical power for the cannon 18 illustrated).

In operation, each dancer D logs onto the contactless entertainer tipping and service ordering system 10 at the start of a shift, via the dancer's computer 16 so that the system knows the dancer D is present. When a patron P enters the establishment, the patron P opens up the app for the contactless entertainer tipping and service ordering system 10 performing any necessary log in procedures, (fingerprint scan, retina scan, password enter, etc.,). If the patron P does not have a payment source linked to their account and is an all cash patron, then the patron P approaches the appropriate person within the establishment (wait staff, bartender, manager, cashier, etc.,), and gives the person a desired sum of money which sum is uploaded to the patron's account. If the patron P gives the person $250, then the patron P has $250 to spend. If the patron P spends the $250, then the patron P can give the appropriate person additional funds to reup their account balance. If the patron P desires to leave before spending the entire $250 (or whatever sum was initially established), then the establishment can set the rules on the remaining balance such as giving the patron P their cash back, or simply holding the sum as a credit within the patron's account.

When a dancer D comes on the stage S, the dancer notifies the contactless entertainer tipping and service ordering system 10 of this fact in appropriate fashion such as via the dancer's computer 16 or via the establishment's computer 14—this may be as simple as having a drop down menu or a thumbnail listing of each dancer D logged in and the dancer D selects their particular credentials to notify the contactless entertainer tipping and service ordering system 10 that the dancer D is on stage S. When a dancer D leaves the stage S, the process is reversed to notify the contactless entertainer tipping and service ordering system 10 that the dancer D is no longer dancing. Of course, other personnel can be in charge of advising the system of which dancers D are on stage S at any given moment.

Figure 3:
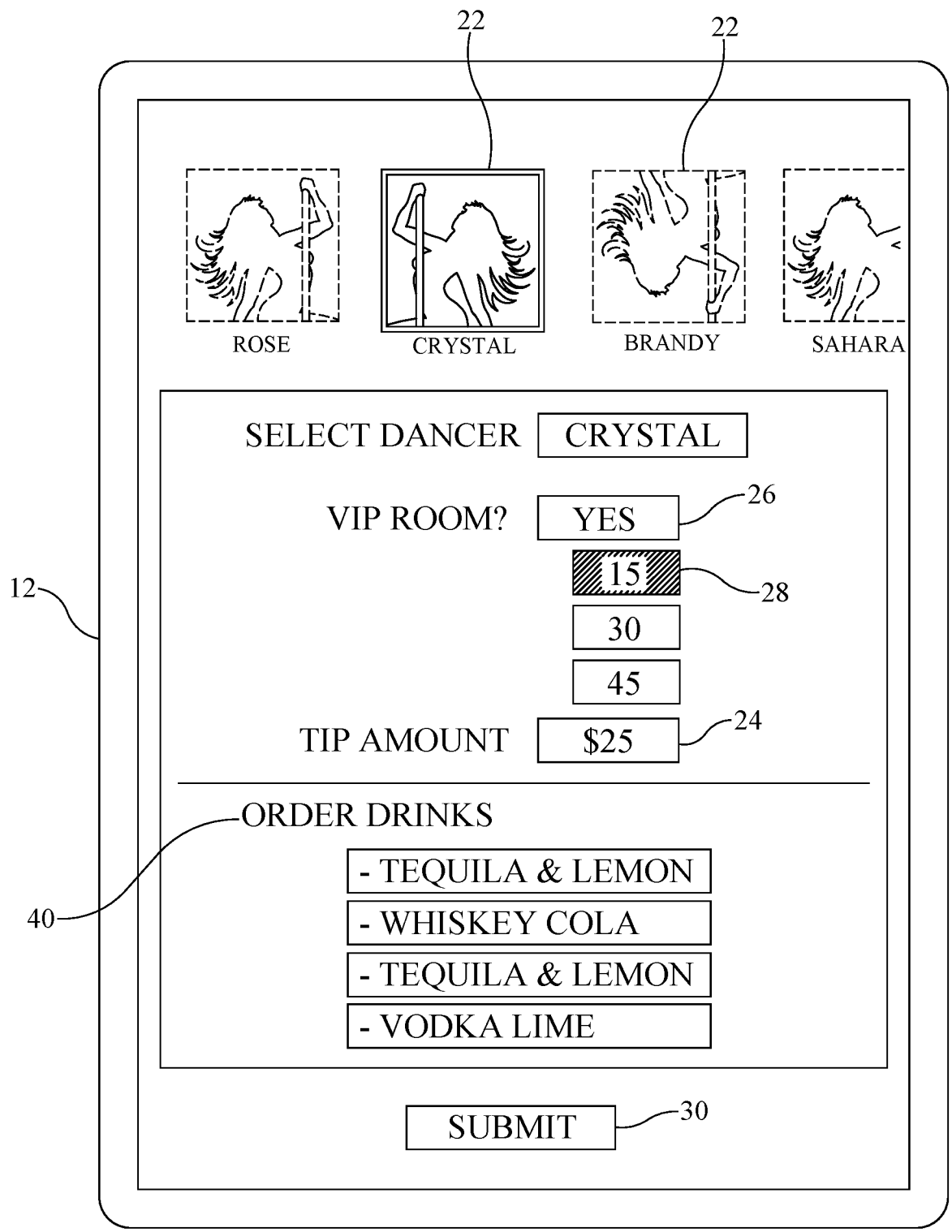
FIG. 3 is a screen shot of the patron's computer screen used within the contactless entertainer tipping and service ordering system.
Figure 4:
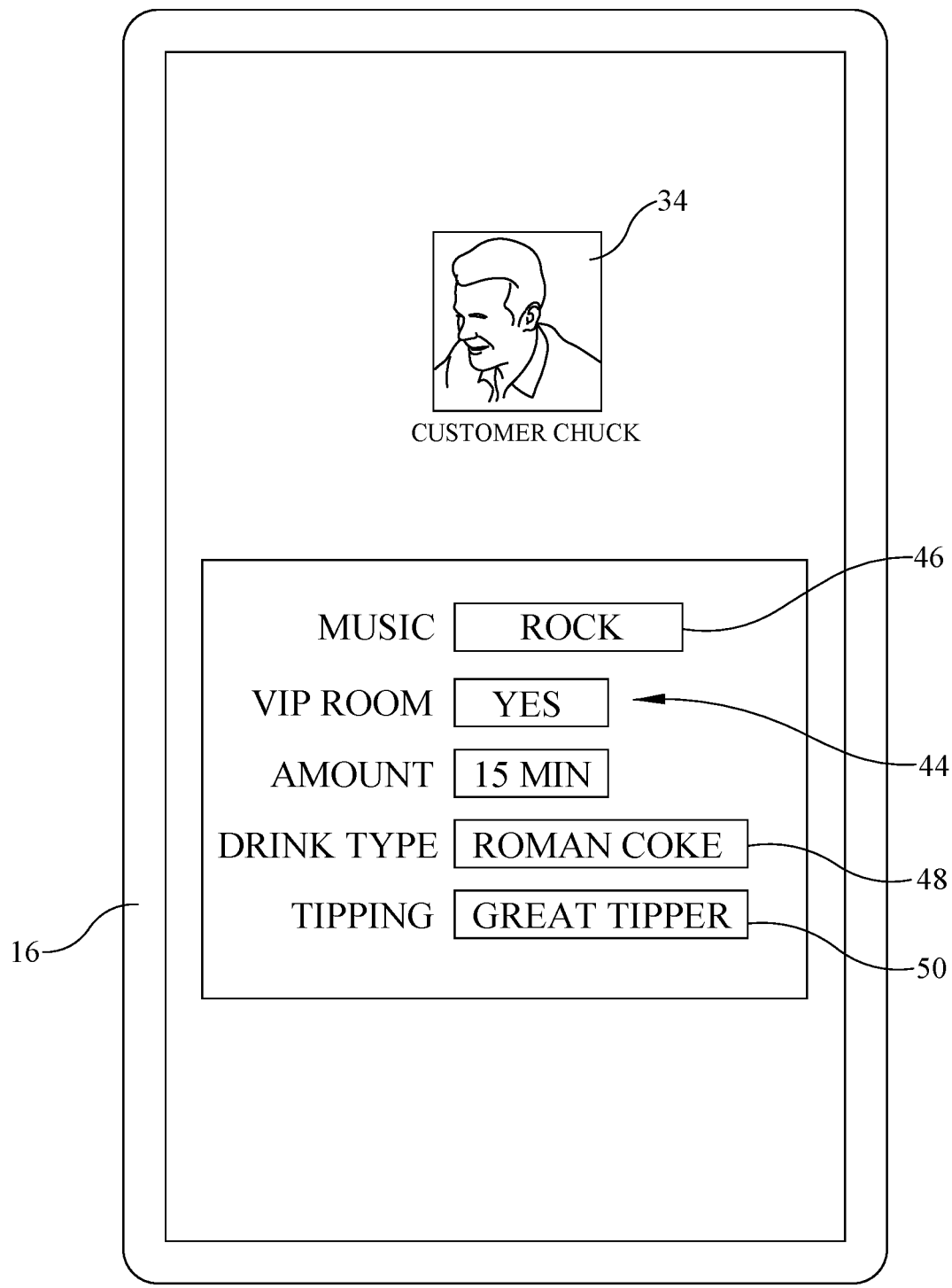
FIG. 4 is a screen shot of the entertainer's computer screen used within the contactless entertainer tipping and service ordering system.

For each dancer D that is on the stage S, a small photo thumbnail 22 appears on the patron's electronic device 12. If the patron P wants to interaction with a particular dancer D (give a tip, request time in the VIP room, etc.,), the patron P selects the thumbnail 22 of the desired dancer—of course if only one dancer D is on the stage S, only one thumbnail 22 will be visible. Once the patron P has selected the thumbnail 22 of a particular dancer D, the patron P then selects the particular action. For example, in FIG. 3, the patron P has selected the thumbnail 32 of dancer Crystal and wants to give Crystal a $25 tip 24 and also wants time in the VIP room 26 (this option may also have an amount of time option 28). Once the patron P is satisfied with their choices, an appropriate submit button 30 is pressed.

The information is sent to the establishment's computer 14. If a tip amount was included in the patron's request, then the establishment's computer 14 sends a signal to the cannon 18 for the cannon 18 to shoot out some currency C, rotating as desired. If the cannon 18 has a speaker 20 associated with it, then the speaker can make an announcement, such as "$25 tip for Crystal from Dave." If the cannon 18 does not have a speaker 18 or in addition to the use of the speaker 20, an appropriate screen appears on the establishment's computer 14 of what transpired so that each dancer D can see who was tipped via the dancers' thumbnails 32, by whom via an appropriate thumbnail 34 of the patron P, and how much was tipped 36. The cannon 18 can shoot a set amount of currency C with each shooting, for example shoot 25 units of currency C with each tip given, or can shoot an amount of currency C that corresponds with the amount of the tip so that if a patron P tips $25, the cannon 18 shoots 25 units of currency C. Each dancer D can also see if any patrons P want additional service such as VIP room attention 38 and again by which patron P via their thumbnail 34. This allows each dancer D to visually identify which patron P gave the tip and the amount of the tip and can perform a personalized dance for that particular patron P.

As seen, the patron's app on their electronic device 12 can also allow for ordering of drinks and food 40 if so served so that the patron P selects the desired refreshments in the desired quantities and hits the submit button 30 wherein the establishment's computer 14 can route the order in appropriate fashion such as sending it to the bar's point-of-sale system 42. The patron's app can also have other functionality such as a listing the dancers D that are expected to perform that day, listing such dancers D in their expected order on stage S, possibly with an approximate ETA to arrive on stage. The patron's app can also have typical reporting such as a line item listing of expenditures for that day or even for previous visits.

The establishment's computer 14 keeps track of which dancer D was tipped how much (especially if the cannon 18 shoot imitation currency) so that at the end of the day each dancer D can be paid out appropriately (or have the appropriate amount added to their earnings which are delivered to each dancer D on payday in appropriate fashion). Each dancer D has an app on their computer 16 that interacts with the establishment's computer 14 so that they can track their earning during the dancing day. The dancer's computer 16 can also have desired information such as scheduling of their requested services (customer wants 15 minutes in the VIP room) 44 including information about the patron P such as their preferred music 46, their preferred drink 48, their tipping manner 50, and of course, their thumbnail 34, along with other relevant information so that the dancer D can tailor the patron's experience for maximum enjoyment. Metrics about each patron P are collected and kept by the establishment's computer 14. Such metrics can also be used by wait staff when the patron P first enters the establishment and sits to watch the dancers D or stage, again, to maximize the patron's enjoyment within the establishment, and consequently, increase the establishment's profits.

Similarly, the establishment can access their computer 14 via another computer such as the establishment's master computer. Appropriate reports can be generated as needed Communication between the patron's electronic device 12 and the establishment's computer 14 and via each dancer's computer and the establishment's computer 14 is wirelessly via any appropriate protocol such as Bluetooth, Wi-Fi, cellular, etc. The establishment's computer 14 and the cannon 18 can communicate in similar fashion or a hardwired communication link can also be established.

The cannon 18 can signal to the establishment's computer 14 that the cannon 18 is running low on currency C and needs to be refilled. The establishment's computer 14 can either post a small warning on its screen so that one of the dancers D can communicate this fact to the appropriate person after the dance shift, or the establishment's computer 14 can communicate this fact to another computer of the establishment if the system is so configured—for example, a text to the manager's cellphone.

Of course, the patron's app can have other features such as games to play, advertising for drink or food specials, upcoming events, etc.

While the invention has been particularly shown and described with reference to an embodiment thereof, it will be appreciated by those skilled in the art that various changes in form and detail may be made without departing from the spirit and scope of the invention.

We claim:

1. A contactless tipping system comprising:
an establishment computer having a visual display;
a patron's handheld electronic device in communication with the establishment computer, the handheld electronic device being associated with a profile, the profile containing a thumbnail with a photograph;
a currency cannon having a store of currency therein, in communication with the establishment computer; and
wherein the patron's handheld electronic device creates a first transaction and transmits the first transaction along with the profile to the establishment computer;
wherein the establishment computer further comprises a processor and memory storing executable instructions that when executed by the processor causes the processor to perform the steps of: dispensing, via the currency cannon, an amount of currency based on the first transaction, and
displaying the first transaction along with the profile including the thumbnail and its photograph on the visual display.

2. The contactless tipping system as in claim 1 further comprising a speaker and the memory further storing instructions that when executed by the processor causes the processor to perform the step of: broadcasting, via the speaker, a message associated with the first transaction.

3. The contactless tipping system as in claim 1 further comprising a point-of-sale computer in communication with the establishment computer and the memory further storing instructions that when executed by the processor causes the processor to perform the step of: creating a second transaction and transmitting the second transaction to the point-of-sale computer.

4. The contactless tipping system as in claim 1 wherein the establishment computer further comprises an onboard storage device, and the memory stores instructions that when executed by the processor causes the processor to perform the steps of: receiving transactions from a patron's handheld electronic device and storing the received transactions in the onboard storage device.

5. A contactless tipping system comprising:
an establishment computer having a visual display;
a patron's handheld electronic device in communication with the establishment computer, the patron's handheld electronic device being associated with a profile;
an entertainer's computer in communication with the establishment computer;
a currency cannon having a store of currency therein, in communication with the establishment computer; and
wherein, the patron's handheld electronic device creates either a first transaction or a second transaction and transmits either the first transaction along with the profile including the thumbnail and its photograph or the second transaction along with the profile including the thumbnail and its photograph to the establishment computer;

wherein the establishment computer further comprises a processor and memory storing executable instructions that when executed by the processor causes the processor to perform the steps of: dispensing, via the currency cannon, an amount of currency based on the first transaction, displaying the first transaction along with the profile including the thumbnail and its photograph on the visual display;

transmitting the second transaction along with the profile including the thumbnail and its photograph to the entertainer's computer.

6. The contactless tipping system as in claim 5 further comprising a speaker and the memory further storing instructions that when executed by the processor causes the processor to perform the step of: broadcasting, via the speaker, a message associated with the first transaction.

7. The contactless tipping system as in claim 5 wherein the establishment computer further comprises a processor and memory storing executable instructions that when executed by the processor causes the processor to perform the steps of: displaying the second transaction on the visual display.

8. The contactless tipping system as in claim 5 further comprising a point-of-sale computer in communication with the establishment computer and the memory further storing instructions that when executed by the processor causes the processor to perform the step of: creating a third transaction and transmitting the third transaction to the point-of-sale computer.

9. The contactless tipping system as in claim 5 wherein the establishment computer further comprises an onboard storage device, and the memory stores instructions that when executed by the processor causes the processor to perform the steps of: receiving transactions from a patron's handheld electronic device and storing the received transactions in the onboard storage device.

* * * * *